Patented Aug. 31, 1948

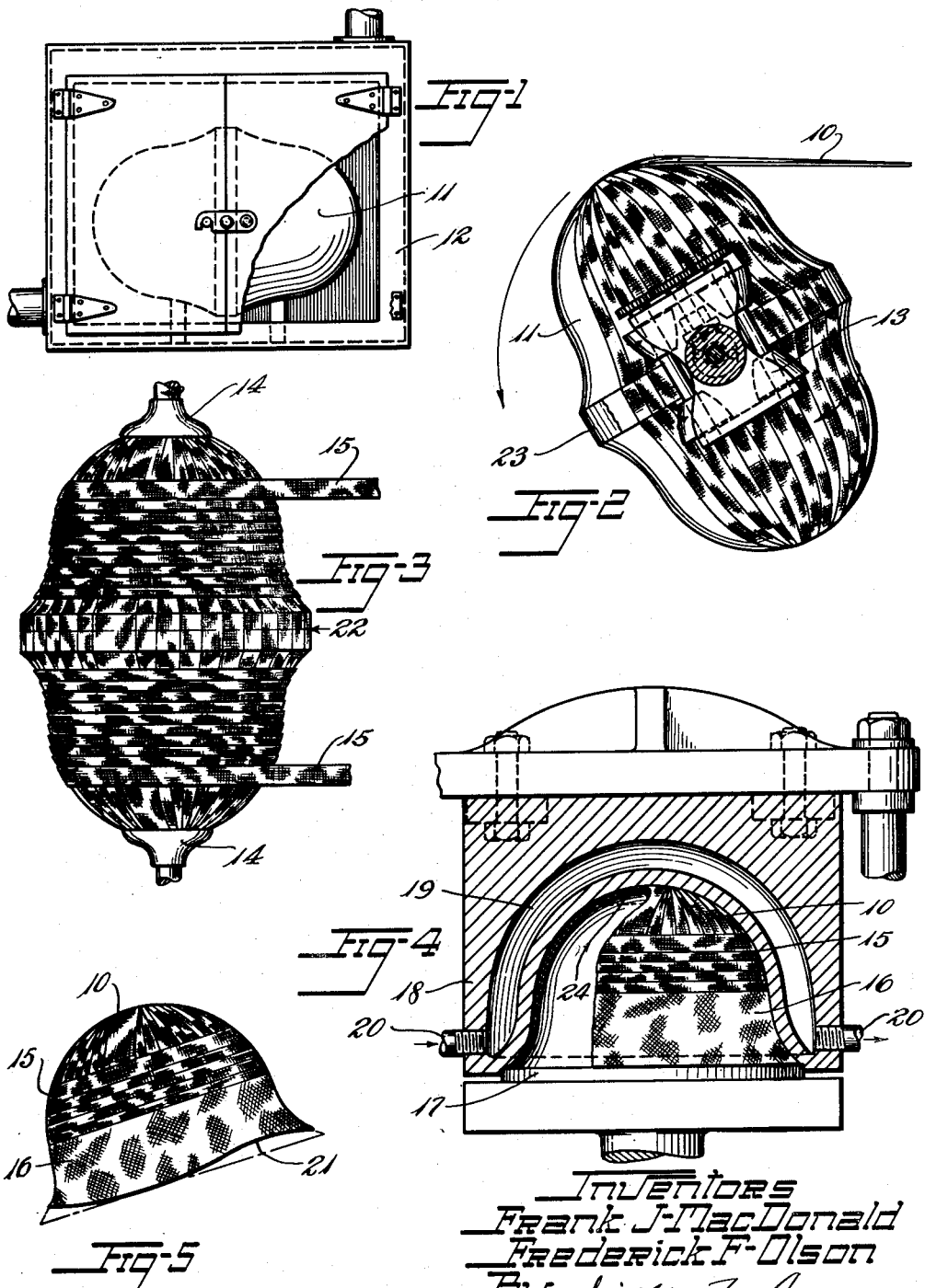

2,448,114

UNITED STATES PATENT OFFICE 2,448,114

METHOD FOR MAKING HEAT-MOLDED ARTICLES CONTAINING FABRIC REINFORCEMENTS

Frederick F. Olson, Sudbury, and Frank J. MacDonald, Brookline, Mass., assignors to The B. F. Goodrich Company, New York, N. Y., a corporation of New York Application May 18, 1943, Serial No. 487,466

8 Claims. (Cl. 154—117)

This invention relates to a method of making molded articles, such as heat-molded articles, and particularly thin-walled articles such as liners for soliders' helmets comprising a thermoset resin containing fabric reinforcements. The invention also relates to the articles so produced and to the apparatus used in making the articles.

We have provided a method of making articles comprising a molded material such as a thermoset resin that is particularly useful for making articles having relatively thin walls, such as the liners used in conjunction with soldiers' helmets. These liners, and similar articles, are usually made from a thermoplastic or a thermoset resin and contain reinforcements of fabric or the like in order to make a strong, durable product.

Generally, in practicing our invention, we arrange the moldable material in the form of thin strips and assemble these strips in overlapping relationship to cover a form having at least a portion of its surface of substantially the same size and shape as the article desired. Then the strips are molded, as by heat and pressure, to the desired shape. The strips can be arranged on the form by progressively winding them around a winding form until they cover the form. As it is desirable that the finished product have reinforcements such as fabric interspersed through the moldable material the strips are preferably of a fabric impregnated with the desired moldable material.

This invention will be described with reference to a particular embodiment as illustrated in the accompanying drawings, of which Fig. 1 is an elevation, partially broken away, showing a winding form in an oven-like structure for heating the form;

Fig. 2 is an elevation illustrating the longitudinal winding of resin-impregnated fabric strips on the winding form;

Fig. 3 is an elevation showing transverse windings of similar resin-impregnated fabric being applied over the longitudinal windings;

Fig. 4 is an elevation of a heated mold press with a helmet liner blank positioned therein for the molding operation, the mold structure and portions of the liner blank being sectioned;

Fig. 5 is an elevation of a molded helmet liner made according to the method of this invention.

The drawings illustrate a preferred method of making fabric-reinforced liners for soldiers' steel helmets. These liners may be made from a thermoplastic or a thermosetting resin although it is preferred that the resin be of the thermosetting type as exemplified by the phenolic or phenol-aldehyde resins and the urea-aldehyde resins, the phenol-formaldehyde, phenol-furfuraldehyde and urea-formaldehyde resins being most satisfactory. Suitable thermosetting resins are available commercially, under many different trade names and trade designations such as "Bakelite," "Durez," "Resinox," "Tego," "Uformite," etc., designed particularly for fabric impregnation and pressure molding work.

In practicing the method of this invention for making fabric-reinforced liners for soldiers' steel helmets there is first provided, for example, a 4-ounce high count, cotton sheeting or like fabric. This sheeting is impregnated with "Resinox No. 790," a phenol-formaldehyde resin, and then cut into strips 10 about two inches wide. These impregnated strips should preferably be made up of from 50 to 60% by weight cotton and from 50 to 40% resin, the proportions in a typical example being 54% cotton and 46% resin. These proportions may, however, be varied considerably. Next there is provided a winding form 11 made of a suitable rigid heat-retaining material such as a metal, and preferably cast aluminum. The form has substantially the size and shape of two helmet liners placed brim-to-brim and preferably has a thin hardened steel band 23 or the like disposed around the equator of the form to provide a cutting anvil as will appear later. This winding form is placed in a hot air oven 12 (Fig. 1) and heated by passing hot air through the oven until the form has been heated to a temperature of about 120° F. to 160° F. The heated form is then dusted lightly with talcum, or the like, and placed in a conventional winding machine 13, as illustrated in Fig. 2, and the resin impregnated strips are progressively wound around the form in a longitudinal direction in such a manner that each successive winding overlaps the preceding winding. This is accomplished in the conventional winding machine by rotating the form around an axis passing through the center of the form and at right angles to the longitudinal axis of the form. At the same time that the form is rotated it is also rolled around its longitudinal axis. These simultaneous motions may be varied at will to obtain practically any ratio of revolution. In the present instance, where the impregnated strips are two inches wide, the ratio should be about thirty-two to one. That is, the form should be rotated longitudinally thirty-two times while being rolled one complete turn. This provides thirty-two wrappings of the impregnated strips around the form.

After the longitudinal wrappings have been applied, the form is removed and placed in a second winding machine (Fig. 3) in order to apply transverse windings over the longitudinal windings. This machine comprises two cup-shaped centering heads 14, 14 affixed to rotatable shafts. These heads are aligned to hold the form at the small ends of the form and to rotate it around its longitudinal axis. As the form is rotated ¾ inch wide strips of resin-impregnated fabric 15, 15 are fed in such a manner that the strips are progressively wound on the form in overlapping relationship progressing from near the equatorial zone of the form toward the ends. Approximately ten wrappings are placed on each end of the form, substantially as shown.

After the form has received the wound strips of impregnated fabric the composite windings are cut around the equator of the form, as indicated at 22 in Fig. 3, to make two helmet liner blanks and these blanks are removed from the form. The cutting may be accomplished with convenience and effectiveness by means of a rotating knife acting against the steel band 23 as an anvil. Each of the blanks may be reinforced by placing a circular disc 24 of impregnated fabric of about 3½ inches diameter in the top of the crown of each blank on the inside. Preferably, the blanks are further reinforced by placing a three inch wide strip 16 of impregnated fabric such as cotton duck around the brim on the outside of each blank.

A blank for a helmet liner, prepared in the manner described, is placed in a mold having a male member 17 and a female member 18 whose coacting surfaces describe substantially the shape and dimensions of the finished liner. The blank is then molded under heat and pressure by admitting steam to a steam chamber 19 in the female member of the mold through flow pipes 20, 20, and applying hydraulic pressure to the mold to condense the fabric-resin structure while the heat sets the thermosetting resin. As the resin softens under the heat the pressure causes it to flow uniformly between the acting faces of the mold. Continued heating sets the resin and thus there is produced a composite serried product consisting of the theromset resin with the fabric reinforcements interspersed therethrough.

The temperature of the heating and the time interval through which pressure is maintained, in producing the helmet liner, depends upon the nature of the particular thermosetting resin used. The time interval also is dependent upon the temperature as, in general, lower temperatures require longer heating periods while with higher temperatures the heating period is materially shorter. Where the thermosetting resin is the phenolformaldehyde resin previously mentioned, the pressure may be about 240 pounds per square inch and heating should be maintained for about eight minutes by admitting steam to the steam chamber of the mold at around 125 pounds per square inch, gauge pressure. This pressure produces a temperature of about 353° F.

At the end of the molding period the helmet liner is removed from the mold and the edge 21 is trimmed to shape. This completes the production of a molded helmet liner, the other blank, of course, being molded separately in a similar fashion. Thereafter, the liner is provided with head-harness, sprayed with a dull paint, and otherwise finished.

The completed liner (Fig. 5) is a hard, strong structure capable of withstanding extreme abuse in addition to the wear and tear to which such liners are ordinarily subjected. Each liner for soldiers' helmets consists of a thermoset resin containing fabric strips interspersed therethrough. The longitudinal strips are progressively arranged in overlapping relationship around the liner with all crossing at the peak of the crown. The two ends of each strip terminate at points on the brim of the liner substantially diametrically opposite each other. In addition to these longitudinal strips there are also provided a separate layer comprising a transverse winding of one continuous strip with adjacent windings overlapping. For greater strength it is preferred that there also be a fabric section of circular shape on the inside of the liner at the peak of the crown and a relatively wide fabric strip on the outside of the article around the brim. The resin and the fabric reinforcements serve to make up a composite serried product that is well condensed in structure.

In the foregoing description of this invention it was indicated that the longitudinal windings be applied to the winding form first and then the transverse windings applied over these. It should be pointed out, however, that this procedure is not essential as the windings may be applied in any order desired. In fact this is one of the advantages of the invention. The individual windings may be wound on the winding form in any manner desired in order that the helmet liners will have areas of great strength, such as at the peak of the crown, and areas of great flexibility, such as at the brim. The windings may be applied to the form in any manner to give these areas of strength and of flexibility. For instance, in the method shown, the windings all cross at the peak of the crown and this gives the greatest strength at the peak where it is most needed. The brim portions of the liner, where flexibility is to be desired, are thinner than the portion at the peak. In order that the sides of the crown of the liner shall have a measure of increased strength the particular method set out herein also includes transverse windings applied to the helmet liner. In addition to the wide degree of latitude in placing the windings it is also possible to use inserts of resin impregnated fabric at various sections of the helmet liner as additional reinforcements, as in the cases of the circular insert that is placed in the inside of the crown at the peak and the wide strip placed around the edge of the brim. Such inserts may be associated with the prepared blanks before they are placed in the mold or, as with the crown inserts, the insert itself may be positioned in the mold before the blank is placed therein. The helmet liner of this invention is light in weight, very strong, and can be produced economically with a minimum of material wastage. Because of reduced wastage, the method has effected a reduction of as much as 20% in the total quantity of resin and fabric material formerly needed to produce a required number of helmet liners. The method is easily adaptable so that products having widely varying characteristics can be made, and the equipment required for practicing the method of the invention is simple and inexpensive. The building up of the liner blanks by winding strips around a form is an ideal procedure for making articles having irregular shapes. It permits exacting control with very small variations in the total weight and the strength of successive liners. Because the windings can be placed on the winding form in any area desired there is eliminated the dangers of breakage of the fabric in the molding operation due to nubs and folds.

The reinforcements may be any of the conventional reinforcing materials including fabrics of cotton, flax, wool, rayon, Nylon, or similar natural or synthetic fibers. The reinforcing material that is preferred however, is a high count cotton sheeting. This material combines the quality of light weight with strength. The moldable material may be any of the ordinary thermoplastic or thermosetting resins that may be molded, hardened, or set by heat, pressure, or both heat and pressure. Those which are preferred are the quick drying, heat and water-resistant, rapid setting thermosetting resins of the character hereinabove indicated although it is possible, in applications where the product will not be subjected to elevated temperatures in use, to substitute thermoplastic resins such as cellulose acetate, cellulose acetate butyrate, vinyl resins such as polyvinyl acetate, acrylic ester resins, polystyrene resins, and the like. The resins used may be suspended in water, alcohol, or other solvent or dispersion medium. They may be applied to the fabric by spreading the resin onto the fabric by means of spreader rolls, by immersing the fabric in a suspension of the resin in liquid followed by evaporation of the liquid, or by any similar method.

Because the strips of impregnated fabric are relatively stiff and are not adhesive they should be preliminarily heated in order that they may become flexible and so that the windings will adhere to each other. This is conveniently done by the previously described preferred method of heating the winding form before winding the strips thereon, but the strips may also be heated by passing them over a hot surface, passing them around heated rolls, or they may be heated on the winding form by smoothing them down with a hot iron. This causes the strips to adhere together and retain their position while the blanks are transferred from the winding form to the mold. However supplied, the heat causes light adhesion between the several wrappings and unites them sufficently to permit handling the blanks as unitary articles. In molding the blanks the temperature of molding depends primarily upon the type of moldable material used while the pressure used may vary over a wide range all of which is well understood in the resin molding art. In the mold described herein both mold members are of steel. However, if desired, one of the mold members, such as the female member, may be of steel or other metal, while the male member may be of an extensible or flexible material, such as rubber. In this latter case the male member could be a rubber bag in which fluid pressure is maintained to provide the pressure necessity for molding the liner blanks.

The invention described herein is useful in manufacturing a variety of articles other than liners for soldiers' helmets. It is well adapted to the manufacture of many parts for automobiles, airplanes, refrigerators, furniture and numerous other articles having unusual contours. Although it is particularly useful for making articles having relatively thin walls it may be used for making thick articles by merely plying up a greater number of impregnated fabric strips before the molding operation. The invention has been described in considerable detail as to its various features not only so that the invention may be readily practiced but also in order that its many advantages may be appreciated. It is to be understood, however, that the invention is not to be limited by these details but rather construed broadly within the spirit and scope of the appended claims.

We claim:

1. The method of making head-covering articles such as liners for soldiers' helmets which comprises providing a form having substantially the size and shape of a pair of the liners oppositely directed and placed brim-to-brim, providing strips of fabric impregnated with a thermosetting resin, substantially covering the form with at least two separate and distinct layers of progressively wound and edge-overlapping windings of the impregnated strips, one of said layers being arranged with the strips lying in a longitudinal direction on said form and the other of said layers being arranged with the strips lying in a transverse direction on said form, severing the windings at substantially the equator of the form to provide two generally similar blanks, and thereafter molding each of the blanks in substantially the desired size and shape to set the thermosetting resin.

2. The method of making head-covering articles such as liners for soldiers' helmets which comprises providing a form having substantially the size and shape of a pair of the liners oppositely directed and placed brim-to-brim, providing strips of fabric impregnated with a thermosetting resin, progressively winding the strips in edge-overlapping relationship longitudinally around the form to cover the form, progressively winding other lengths of impregnated strips in edge-overlapping relationship transversely around the form, severing the strips at substantially the equator of the form to provide two generally similar blanks, and thereafter molding each of the blanks in substantially the desired size and shape to set the thermosetting resin.

3. The method of making head-covering articles such as liners for soldiers' steel helmets which comprises providing a heat-retaining form having substantially the size and shape of a pair of liners oppositely directed and placed brim-to-brim, providing strips of fabric impregnated with a thermosetting resin, heating the form to such a temperature as will soften the resin of the impregnated strips and render it adhesive, substantially covering the form with at least two separate and distinct layers of progressively wound and edge-overlapping windings of the impregnated strips, one of said layers being arranged with the strips lying in a longitudinal direction on said heated form and the other of said layers being arranged with the strips lying in a transverse direction on said heated form, severing the windings at substantially the equator of the form to provide two generally similar blanks, and thereafter molding each of the blanks in substantially the desired size and shape to set the thermosetting resin.

4. The method of making head-covering articles such as liners for soldiers' steel helmets which comprises providing a heat-retaining form having substantially the size and shape of a pair of liners oppositely directed and placed brim-to-brim, providing strips of fabric impregnated with a thermosetting resin, heating the form to such a temperature as will soften the resin of the impregnated strips and render it adhesive, progressively winding the impregnated strips in edge-overlapping relationship longitudinally around the heated form to cover the form, progressively winding other lengths of impregnated strips in edge-overlapping relationship transversely around the form, severing the strips at substantially the equator of the form to provide two generally similar blanks, and thereafter molding each of the blanks in substantially the desired size and shape to set the thermosetting resin.

5. The method of making head-covering articles such as liners for soldiers' steel helmets which comprises providing a heat-retaining form having substantially the size and shape of a pair of the liners oppositely directed and placed brim-to-brim, providing strips of fabric impregnated with a thermosetting resin, heating the form to such a temperature as will soften the resin of the impregnated strips and render it adhesive, progressively winding the impregnated strips in edge-overlapping relationship longitudinally around the heated form to cover the form, progressively winding other lengths of impregnated strips in edge-overlapping relationship transversely around the form to provide two windings, each transverse winding extending from near the equatorial zone of the form toward the end of the form, severing the strips at substantially the equator of the form to provide two generally similar blanks, and thereafter molding each of the blanks in substantially the desired size and shape to set the thermosetting resin.

6. The method of making head-covering articles such as liners for soldiers' helmets which comprises providing a heat-retaining form having substantially the size and shape of a pair of the liners oppositely directed and placed brim-to-brim, providing strips of fabric impregnated with a thermosetting resin, heating the form to such a temperature as will soften the resin of the impregnated strips and render it adhesive, progressively winding the impregnated strips in edge-overlapping relationship longitudinally around the heated form to cover the form, progressively winding other lengths of impregnated strips in edge-overlapping relationship transversely around the form to provide two windings, each transverse winding extending from near the equatorial zone of the form toward the end of the form, severing the strips at substantially the equator of the form to provide two generally similar blanks, placing a strip of resin-impregnated fabric around the outside of the brim of each blank, placing a disk of resin-impregnated fabric on the inside of the crown of each blank at substantially the peak, and molding each of the blanks in substantially the desired size and shape to set the thermosetting resin.

7. The method of making composite articles of hollow cup shape comprising fabric and heat-molded resin, which comprises providing a generally oblate spheroidal form having an equatorial zone of hard material providing a cutting anvil about the minor circumference of the form, causing the form to rotate simultaneously about a major axis and a minor axis while progressively wrapping thereon a strip of fabric material treated with a heat-moldable resin, the said strip being wrapped spirally about the longer circumference of the form and successive convolutions being partially but not completely overlapped edgewise circumferentially about the shorter circumference of the form so as to cover the form completely, severing the covering in an equatorial zone to provide two similarly-shaped blanks by cutting against the said anvil, and separately molding the two blanks to produce similarly-shaped products.

8. The method of making composite articles of hollow cup shape comprising fabric and heat-molded resin, which comprises providing a generally oblate spheroidal form having an equatorial zone of hard material providing a cutting anvil about the minor circumference of the form, causing the form to rotate simultaneously about a major axis and a minor axis while progressively wrapping thereon a strip of fabric material treated with a heat-moldable resin, the said strip being wrapped spirally about the longer circumference of the form and successive convolutions being partially but not completely overlapped edgewise circumferentially about the shorter circumference of the form so as to cover the form completely, causing the form to rotate about its major axis only while wrapping thereon a strip of fabric material treated with a heat-moldable resin, the said strip being wrapped spirally about the shorter circumference of the form on either side of the equator and with successive convolutions partially but not completely overlapped edgewise, severing the covering in an equatorial zone to provide two similarly-shaped blanks by cutting against the said anvil, and separately molding the two blanks to produce similarly-shaped products.

FREDERICK F. OLSON.
FRANK J. MACDONALD.

REFERENCES CITED

The following references are of record in the file of this patent:

UNITED STATES PATENTS

| Number | Name | Date |
| --- | --- | --- |
| 224,784 | Johnstone | Feb. 24, 1880 |
| 1,290,539 | Gerber | Jan. 7, 1919 |
| 1,504,547 | Egerton | Aug. 12, 1924 |
| 1,674,781 | Kelley | June 26, 1928 |
| 1,783,112 | Eichenbaum | Nov. 25, 1930 |
| 1,979,954 | Bergman | Nov. 6, 1934 |
| 2,020,191 | Katz | Nov. 5, 1935 |
| 2,157,580 | Voit et al. | May 9, 1939 |
| 2,298,602 | Varon | Oct. 13, 1942 |
| 2,302,226 | Josephs | Nov. 17, 1942 |
| 2,312,227 | Yant | Feb. 23, 1943 |
| 2,329,207 | Lovell | Sept. 14, 1943 |
| 2,363,933 | Bendix | Nov. 28, 1944 |
| 2,393,347 | Stuart et al. | Jan. 22, 1946 |
| 2,420,522 | Daly | May 13, 1947 |
| 2,423,076 | Daly | July 1, 1947 |